United States Patent [19]

Miura et al.

[11] Patent Number: 4,739,678

[45] Date of Patent: Apr. 26, 1988

[54] OIL SEPARATING STRUCTURE OF AUTOMATIC TRANSMISSION

[75] Inventors: Masakatsu Miura, Kariya; Takeshi Inuzuka, Anjo; Tatsuya Iwatsuki, Okazaki; Seitoku Kubo, Toyota; Koujiro Kuramochi, Okazaki, all of Japan

[73] Assignees: Aisin-Warner Limited; Toyota Jidosha Kabushiki Kaisha, both of Japan

[21] Appl. No.: 807,161

[22] Filed: Dec. 9, 1985

[30] Foreign Application Priority Data

Dec. 13, 1984 [JP] Japan .................. 59-263653

[51] Int. Cl.$^4$ ............................................. F16H 37/04
[52] U.S. Cl. ........................... 74/665 T; 74/467; 180/24; 180/248
[58] Field of Search ............ 74/467, 740, 701, 665 T; 180/247, 248, 249, 250

[56] References Cited

U.S. PATENT DOCUMENTS

| | | | |
|---|---|---|---|
| 2,927,654 | 3/1960 | Lee | 180/250 |
| 4,476,953 | 10/1984 | Hiraiwa | 180/247 |
| 4,484,654 | 11/1984 | Hayakawa | 180/248 X |
| 4,520,690 | 6/1985 | Dangel | 74/705 |
| 4,541,503 | 9/1985 | Akutagawa | 180/247 |
| 4,560,056 | 12/1985 | Stockton | 74/467 |
| 4,601,359 | 7/1986 | Weismann et al. | 74/705 |
| 4,602,526 | 7/1986 | Ashikawa | 74/701 |
| 4,602,696 | 7/1986 | Taga et al. | 180/247 |
| 4,606,243 | 8/1986 | Ashikawa et al. | 180/249 X |

FOREIGN PATENT DOCUMENTS 81225  5/1984  Japan .................. 180/248

Primary Examiner—Lawrence J. Staab
Assistant Examiner—Dwight G. Diehl
Attorney, Agent, or Firm—Steele, Gould & Fried

[57] ABSTRACT

A four wheel drive automatic transmission, comprising: a speed-changing transmission unit; a front wheel transmission mechanism driven by the transmission unit and having a large driving gear and bearings for the large driving gear; a center differential unit having an input member driven by the large driving gear and two output members for driving front wheels and for driving rear wheels, respectively; a transfer with a rear wheel driving transmission having a driving gear member disposed coaxially with the output member for rear wheel driving, a connecting member between the output member for rear wheel driving and the driving gear member and a transfer output gear member driven by the driving gear member; a case in which the front wheel transmission mechanism, the center differential unit and the transfer are disposed; and, an oil separating structure defining separately lubricatable cavities within the case, the structure comprising two seal members, disposed between the connecting member and the case at opposite ends of the rear wheel driving mechanism, whereby the rear wheel driving mechanism is disposed in a cavity within the case which can be filled with a lubricant different from that used for lubricating the transmission unit, the front wheel driving mechanism and the center differential unit, without risk of the different lubricants mixing. The oil separating structure may be so arranged that the cavity for the rear wheel driving mechanism surrounds the other cavity, the connecting member being cylindrical and defining an annular wall separating the cavities between the sealing members.

5 Claims, 3 Drawing Sheets

FIG. I

OIL SEPARATING STRUCTURE OF AUTOMATIC TRANSMISSION

BACKGROUND OF THE INVENTION

1. Field of the Invention

The present invention relates to an oil divider for an automatic transmission which has intersecting gears or skew gears for a four wheel drive system disposed in the case or housing of the automatic transmission.

2. Description of the Prior Art

In a conventional automatic transmission, intersecting gears such as bevel gears or skew gears such as hypoid gears are used to change a direction of output rotation from a speed change mechanism into an almost perpendicular direction of rotation. Since the intersecting gears or skew gears are disposed at the output side of the speed change mechanism, high torque is transmitted to the gears so that high pressure acts on the tooth surface of the gears. For that reason, seizure is likely to occur due to the cut of lubricating oil film. Since hypoid gears have a larger diameter than spiral bevel gears, when they are provided as small gears, the hypoid gears are advantageous in strength. Since the hypoid gears have a large intermeshing ratio, they have another advantage that their intermeshing noise is low. However, because the slip of the tooth surface of the hypoid gears is large, they have disadvantages in that the efficiency is low and seizure is likely to occur. For that reason, it is necessary that an oil, (for example, oil mixed with an extreme pressure additive) different in characteristics from working oil and lubricating oil in the automatic transmission having intersecting gears or skew gears, is used only for the intersecting gears or skew gears in order to prevent the deterioration of efficiency and the occurrence of seizure. Conventionally, only the section having the intersecting gears or skew gears is provided with a chamber in the case of the transmission. Oil seals are provided at the shaft holding the large gear and the shaft holding the small gear, around the chamber, so that the oil which is used in the automatic transmission and the oil which is used for the intersecting gears or skew gears are separated from each other.

In the above-mentioned prior art, the chamber for the intersecting gears or skew gears is defined by the case of the automatic transmission. For that reason, the contour of the transmission is enlarged, the weight of the transmission is increased, and the construction of the transmission is complicated, so that the production cost of the case of the transmission is increased.

SUMMARY OF THE INVENTION

An object of the present invention is to provide an oil separating structure, which can separate oil in the the same transmission case including the other components of transmission, without further forming the transmission case to make a separate chamber for intersecting gears or skew gears, in the automatic transmission.

In order to solve the above-mentioned problems, the oil separating structure, which is provided according to the present invention, is constructed so that in the automatic transmission which includes a large gear and a small gear combined with each other in a case of the transmission and includes intersecting gears or skew gears which change a direction of rotation into an almost perpendicular direction of rotation, lubricating oil for the intersecting gears or skew gears is separated from other oil in the case of the transmission by furnishing oil seals between the case of the transmission and a shaft fitted with the large gear. Since the oil separating structure described above has the oil seals between the case of the automatic transmission and the shaft fitted with the large gear, the oil can be separated in the same transmission case including the other components of transmission, without further forming the transmission case to make a separate chamber for hypoid gears, in the automatic transmission. For that reason, the automatic transmission can be designed to be compact, the weight of the transmission is reduced, and the production cost of the transmission is lowered. These and other objects will become apparent from the following detailed description taken in connection with the accompanying drawings.

DETAILED DESCRIPTION OF THE PREFERRED EMBODIMENTS

Figure 1:
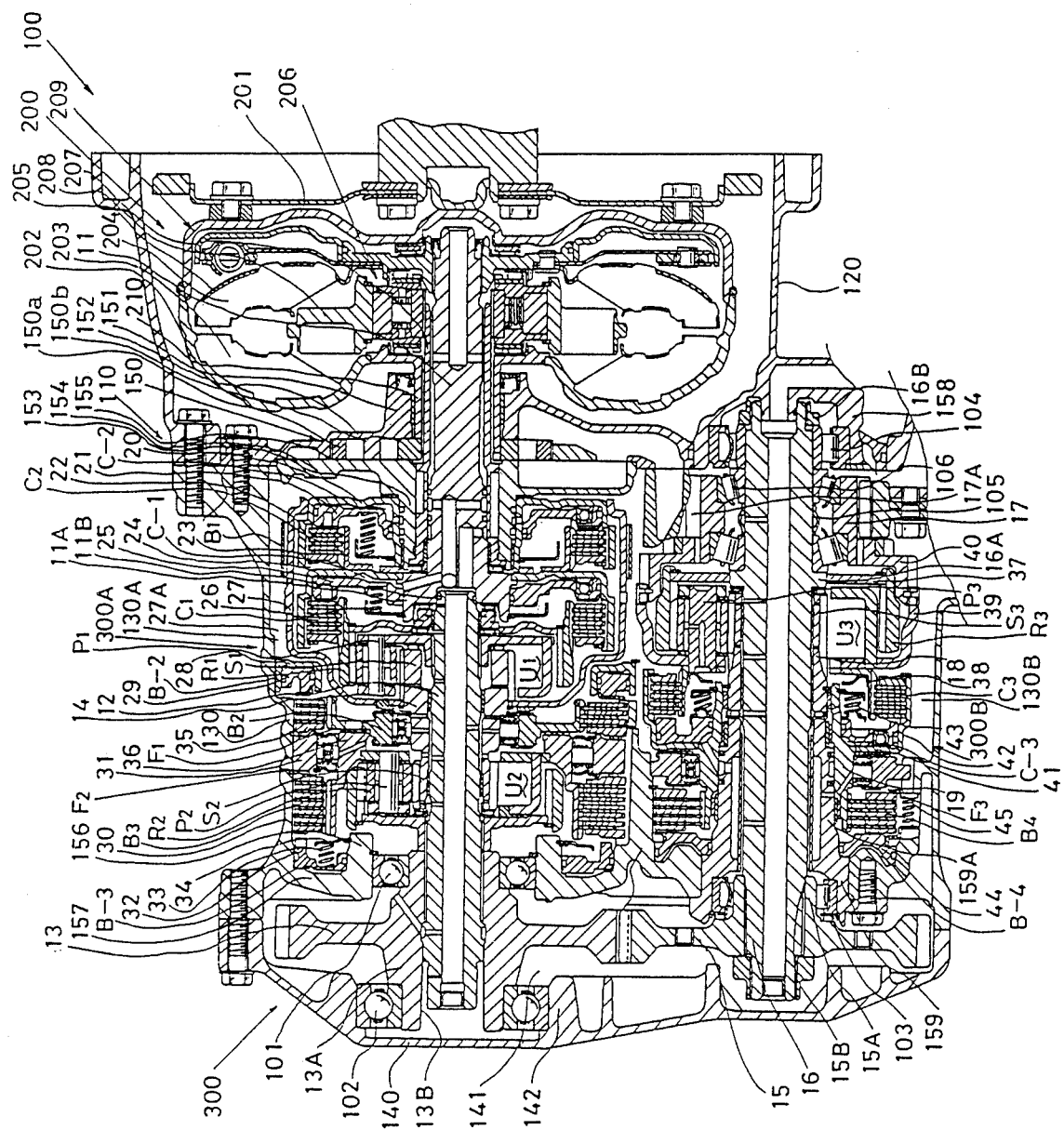
FIG. 1 is a section view of the main portion of an automatic transmission for a vehicle, incorporating an oil separating structure according to the present invention.
Figure 2:
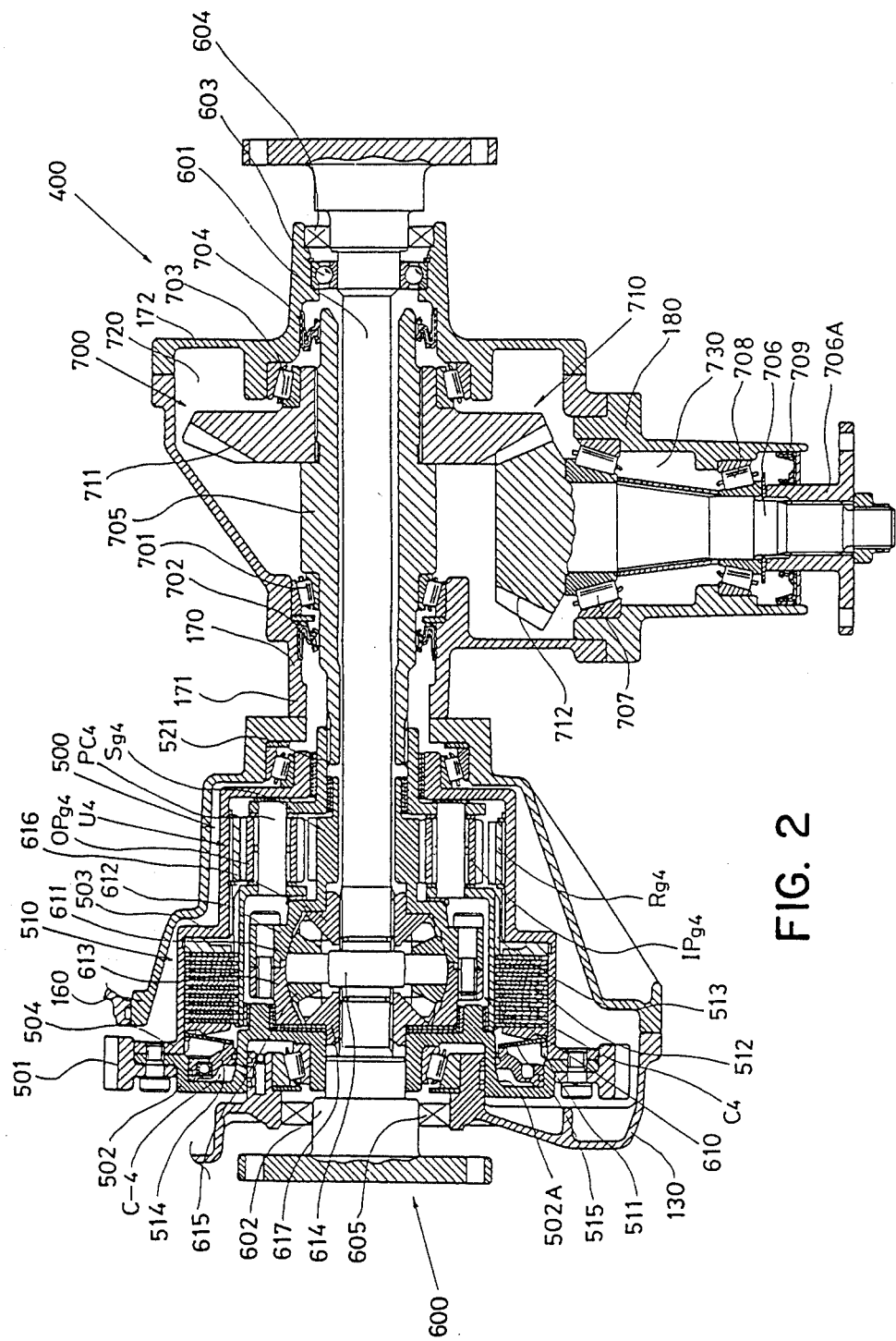
FIG. 2 is a section view of a four-wheel-drive transfer for the transmission shown in FIG. 1; and, FIG. 3 is a section view of a four-wheel-drive transfer according to another embodiment of the invention.

A presently preferred embodiment of an oil separating structure according to the present invention, is hereinafter described with reference to the drawings. FIGS. 1 and 2 are sectional views of an automatic transmission providing four-forward-speed and one-backward-speed four-wheel drive, and incorporating the present invention. The automatic transmission 100 comprises a fluid torque converter 200, a transmission unit 300, a four-wheel-drive transfer 400, and a hydraulic controller not shown in the drawings.

The transmission unit 300 comprises a first planet gear unit U1, a second planet gear unit U2, a three-forward-speed and one-backward-speed underdrive speed change unit 300A including two multiple-disk clutches C1 and C2, which are operated by a hydraulic servo-mechanism, a band brake B1, two multiple-disk brakes B2 and B3, a one-way clutch F1 and a one-way brake F2, a third planet gear unit U3, and an auxiliary speed change unit 300B including a multiple-disk clutch C3 which is operated by a hydraulic servomechanism, a multiple-disk brake B4 and a one-way brake F3.

The case 110 of the automatic transmission 100 consists of plural split portions firmly clamped together by bolts.

The torque converter 200 is housed in a torque converter case 120 open rightward as to the drawings, and comprises: a front cover 201 which is rotated by an engine not shown in the drawings, an annular rear cover 202 welded on the inner portion of the front cover 201, a pump impeller 203 provided on the inside circumferential surface of the rear cover 202, a turbine runner 204 disposed in the face of the pump impeller 203, a turbine shell 205 holding the turbine runner 204, a stator 208 which is supported by a fixed shaft 207 coupled to the transmission case 110 through a one-way clutch 206 and which increases the torque capacity when the input rotational frequency is low, and a lockup clutch 209 provided between the front cover 201 and the turbine shell 205 to rotate the front cover and the turbine shell at the same speed. An inscribed gear pump 150 for oil, in which an external gear 150a and an internal gear 150b are provided, is housed between the torque converter housing 120 and a cylindrical transmission case 130 extending continuously leftward (as to the drawings) from the torque converter case 120. The body 152 of the oil pump 150, which has a cylindrical portion 151 projecting rightward inside, is clamped at the right of the transmission case 130 containing the transmission unit 300. An extending member 210 coupled to the inner end of the rear cover 202 is spline-coupled to the inner portion of the external gear 150a through the inner part of the cylindrical portion 151. An oil pump cover 154 provided with a cylindrical front support 153 projecting backward coaxially with the cylindrical portion 151 is clamped at the left of the oil pump body 152 so that the oil pump body 152 and the oil pump cover 154 form a partition wall 155 between the torque converter case 120 and the transmission case 130. An underdrive speed change mechanism chamber 130A, in which the underdrive speed change unit 330A is placed, and an auxiliary speed change mechanism 130B, in which the auxiliary speed change 300B is placed, are provided in the upper and lower halves of the interior of the transmission case 130, respectively. A fixing member 157, which is made of an aluminum alloy and has a cylindrical center support 156 projecting rightward and supports an output gear 13, is provided at the left of the underdrive mechanism chamber 130A. The output gear chamber 141 of the speed change unit is defined between the fixing member 157 and a rear cover 140 clamped by bolts from the left of the transmission case 130. A cylindrical rear support 142 coaxial with the front support 153 projects rightward from the rear cover 140.

A hole-like front support 158 is provided in the right-hand central portion of the cylindrical auxiliary speed change mechanism chamber 130B extending in parallel with the cylindrical underdrive mechanism chamber 130A. A fixing member 159, which has a cylindrical inner portion 159A projecting long rightward, is clamped on the transmission case by bolts at the left of the auxiliary speed change mechanism chamber 130.

The fixed shaft 207 of the one-way clutch 206, which supports the stator 208 of the torque converter 200, is fitted inside the front support 153. The input shaft 11 of the transmission unit 300, which is the output shaft of the torque converter 200, is rotatably supported inside the fixed shaft 207. The left-hand end portion 11A of the input shaft 11, which projects leftward from the front support 153, has the major diameter of the shaft. A leftward hole 11B is provided in the center of the left-hand end portion 11A. A first intermediate transmission shaft 12, which is disposed in series with the input shaft 11, is rotatably fitted at the left of the input shaft. The right-hand end of the first intermediate transmission shaft 12 is placed in slide contact with the inside of the hole 11B. The left-hand end of the shaft 12 is spline-fitted in the inner hole 13B of the central cylindrical portion 13A of the output gear 13. The cylindrical portion 13A of the output gear 13 is supported by ball bearings 101 and 102 for the smooth rotation of the output gear, between the center support 156 of the fixing member 157, the rear support 142 and the cylindrical portion 13A of the output gear 13. A sun gear shaft 14 is rotatably fitted with a bearing outside the right-hand end of the first intermediate transmission shaft 12.

The central cylindrical part 15A of the input shaft 15 of the auxiliary speed change unit 300B, which is engaged with the output gear 13, is supported by a roller bearing 103 on the inner portion 159A. The left-hand end of a second transmission shaft 16 extending through the center of the auxiliary speed change mechanism chamber 130B is spline-fitted in the internal hole 15B of the input gear 15. A flange-like projection 16A is provided on the halfway portion of the second intermediate transmission shaft 16. The shaft 16 is rotatably supported at the left-hand end by a roller bearing 104 in the hole-like front support 158. A transmission shaft 17, which is an output section having the output gear 17A of the two-axis automatic transmission (which is a multi-speed transmission comprising the underdrive unit 300A and the auxiliary speed change unit 300B), is supported by a pair of tapered roller bearings 106 pinching a spring material 105 between them and previously adjusted for pressure by a nut 16B tightened in front of the bearings 104, between the flange-like projection 16A and the roller bearing 104 on the second intermediate transmission shaft 16. An output gear 91 on the transmission shaft 17 is engaged with the driving large gear 501 of the transfer 400.

A cylindrical sun gear shaft 18 is rotatably supported with a bushing between the inner portion 159A and the flange-like projection 16A on the second intermediate transmission shaft 16. A cylindrical outer member 19 is rotatably supported with a bushing outside the inner portion 159A. The outside of the left-hand end portion of the sun gear shaft 18 and the inside of the right-hand end portion of the outer member 19 are spline-fitted with each other.

In the right-hand portion of the underdrive mechanism chamber 130A, a first hydraulic servo drum 20 open leftward is rotatably fitted on the front support 153. An annular piston 21 is fitted between the inside and outside circumferential walls of the drum 20 so that the hydraulic servomechanism C-2 of the clutch C2 is formed. A return spring 22 is provided on the inside circumferential wall. The clutch C2 is provided inside the outside circumferential wall. A second hydraulic servo drum 24 open leftward and having an annular projection 23 rightward is fixed on the left-hand end portion 11A of the input shaft 11 at the left of the first hydraulic servo drum 20. An annular piston 25 is fitted between the left-hand end portion 11A and the outside circumferential wall of the servo drum 24 so that the hydraulic servomechanism C-1 of the clutch C1 is formed. A return spring 26 is provided on the inside circumferential wall of the drum 24. The clutch C1 is provided inside the outside circumferential wall of the drum 24. The clutch C2 is placed around the annular projection 23. The first and the second hydraulic servo drums 20 and 24 are coupled to each other through the clutch C2. The first planet gear unit U1 is provided at the left of the second hydraulic servo drum 24. The ring gear R1 of the first planet gear unit U1 is connected to the second hydraulic servo drum 24 through the clutch C1. The carrier P1 of the unit U1 is spline-fitted with the right-hand end of the first intermediate transmission shaft 12. The sun gear S1 of the unit U1 is provided integrally to the sun gear shaft 14. A coupling drum 27, which is formed to cover the first and the second hydraulic servo drums 20 and 24 and the first planet gear unit U1 by the minimum space, is secured at the right-hand end on the outside of the first hydraulic servo drum 20 and coupled at the left-hand end to the sun gear shaft 14 at the left of the first planet gear unit U1. The band brake B1 is provided on the outside circumferential wall of the drum 27.

A third hydraulic servo drum 28, which is annular in shape and open leftward, is secured in a surplus space 27A outside the coupling drum 27 outside the first planet gear unit U1. A piston 29 is fitted in the drum 28 so that the hydraulic servomechanism B-2 of the brake B2 is formed. The brake B2, the outer race 31 of the one-way brake F2 and the multiple-disk brake B3 are fitted in that order in spline grooves 30 provided on the inside of the transmission case 130 at the left of the hydraulic servomechanism B-2. A piston 32 is fitted in an annular opening between the torque converter 200 and the outside circumferential wall of the center support 156 of the fixing member at the left of the brake B2, the outer race 31 and the brake B3 so that the hydraulic servomechanism B-3 of the multiple-disk brake B3 is formed. The return spring 33 of the hydraulic servomechanism B-3 is supported by a flange plate 34 provided at the right-hand end of the center support 156. The one-way clutch F1, whose inner race is the sun gear shaft 14 is provided inside the multiple-disk brake B2. The outer race 35 of the clutch F1 is coupled to the inner portion of the multiple-disk brake B2. The second planet gear unit U2 is provided at the left of the one-way clutch F1. The sun gear S2 of the second planet gear unit U2 is integrated with the sun gear shaft 14. The carrier P2 of the unit U2 is coupled to the inner race 35A of the outer one-way brake F2 and to the multiple-disk brake B3. The ring gear R2 of the unit U2 is coupled to the first intermediate transmission shaft 12.

The third planet gear unit U3 is provided at the left of the transmission shaft 17. The ring gear R3 of the unit U3 is coupled to the projection 16A of the second intermediate transmission shaft 16 through a flange plate 37. The carrier of the unit U3 is coupled to a coupling cylinder 40, which is an input section, through an output drum 39 provided with an annular projection 38 coupled to the clutch C3. The sun gear of the unit U3 is formed on the sun gear shaft 18. At the left of the third planet gear unit U3, a fourth hydraulic servo drum 41 open rightward is secured on the outer member 19 rotatably supported by a bearing, which is a cylindrical member, on the outside of the inner portion 159A of the fixing member 159. An annular piston 42 is fitted between the outer member 19 and the outside circumferential wall of the drum 41 so that the hydraulic servomechanism C-3 of the clutch C3 is formd. A return spring 43 is provided at the outer member 19. The clutch C3 is placed inside the outside circumferential wall of the drum 41. The drum 41 is coupled to the carrier P3 through the clutch C3. The one-way brake F3, whose inner race is the outer member 19, is provided at the left of the fourth hydraulic servo drum 41. At the left of the brake F3, the brake B4 is provided between the outer member 19 and the transmission case 130. A piston 44 is fitted between the transmission case 130 and the outside of the inner portion 159A of the fixing member 159 at the left of the brake B4 so that the hydraulic servomechanism B-4 of the brake B4 is formed. A return spring 72 is fitted in grooves provided at equal intervals on the outside of the brake B4. Motive power is transmitted to the outer member 19 through the engagement of the carrier P3 of the third planet gear unit U3, the output drum 39 and the clutch C3 so that the outer member 19 is rotated.

In the transmission unit 300, the clutches and the brakes are engaged or disengaged by oil pressure selectively applied from a hydraulic controller (not shown in the drawings) to the hydraulic servomechanism of frictional engaging units depending on vehicle running conditions such as vehicle speed and degree of throttle opening, so that four-forward-speed and one-backward-speed transmission is performed. Table 1 shows examples of the operations of the clutches, the brakes, the one-way clutches and the one-way brakes and achieved speeds.

TABLE 1

| RANGE | Clutch | | | Brake | | | | OWC | | |
|---|---|---|---|---|---|---|---|---|---|---|
| | C1 | C2 | C3 | B1 | B2 | B3 | B4 | F1 | F2 | F3 |
| P | X | X | X | X | X | X | E | f | f | f |
| R | X | E | X | X | X | E | E | f | f | f |
| N | X | X | X | X | X | X | E | f | f | f |
| D | | | | | | | | | | |
| 1 | E | X | X | X | X | X | E | f | L | (L) |
| 2 | E | X | X | X | E | X | E | L | f | (L) |
| 3 | E | E | X | X | E | X | E | f | f | (L) |
| 4 | E | E | E | X | E | X | X | f | f | f |
| S | | | | | | | | | | |
| 1 | E | X | X | X | X | X | E | f | L | (L) |
| 2 | E | X | X | E | E | X | E | (L) | f | (L) |
| 3 | E | E | X | X | E | X | E | f | f | (L) |
| (3) | E | E | X | X | E | X | E | f | f | (L) |
| L | | | | | | | | | | |
| 1 | E | X | X | X | X | E | E | f | (L) | (L) |
| 2 | E | X | X | E | E | X | E | (L) | f | (L) |
| (1) | E | X | X | X | X | E | E | f | (L) | (L) |

In Table 1, E denotes the engagement of the clutch or the brake, and X denotes the disengagement of the clutch or the brake. L means that although the one-way clutch is engaged as the engine is running, the engagement is not necessarily needed because the transmission of motive power is guaranteed by the clutch or brake disposed in parallel with said one-way clutch. (L) means that the one-way clutch is engaged only in the running of the engine and not engaged in the braking of the engine, and f means that the one-way clutch is free.

The transfer 400 comprises a planet-gear-type center differential unit 500 which includes a limiting mechanism 510 and to which a fourth planet gear unit U4 made of a dual planet gear set is applied as an operating unit, a front wheel transmission mechanism 600 including a bevel-gear-type front differential unit 610 which is driven through the transmission of motive power from the center differential unit 500 to drive front wheels, and a rear wheel driving mechanism 700 including a hypoid gear 710 which receives motive power from the center differential unit 500 and transmits the motive power to rear wheels. The center differential unit 500 and the front differential unit 610 are contained in a center differential unit housing 160 disposed in parallel with the transmission case 130 and the torque converter case 120. The rear wheel driving mechanism 700 is provided in such a manner that a large gear case 170 made of a left-hand case 171 and a right-hand case 172 clamped on each other at the intermediate portions containing a large gear 711, which is the hypoid gear 710, and a small gear case 180 containing a small gear 712, are clamped on each other.

The center differential unit 500 comprises a driving large gear 501 engaged with the output gear 17A of the transmission unit 300, a center differential case 504 made of a left-hand case 502 and a right-hand case 503 clamped to the driving large gear 501 by bolts, the fourth planet gear unit U4 composed of a ring gear Rg4 provided in the right-hand case 503, an outer pinion OPg4 engaged with the ring gear Rg4, an inner pinion IPg4 engaged with the outer pinion OPg4, a sun gear Sg4 engaged with the inner pinion IPg4, and a planet carrier PC4 rotatably supporting the outer pinion IPg4 and the inner pinion IPg4, and the limiting mechanism 510. Limiting mechanism 510 comprises: a multiple-disk clutch C4 engaged with the inner splines 511 of the right-hand case 503 and the outer splines 513 of an annular projection 512 provided at the left of the planet carrier PC4 of the fourth planet gear unit U4, a piston 514 fitted in the annular hole 502A of the left-hand case 502 to push the multiple-disk clutch C4, a hydraulic servomechanism C-4 provided between the annular hole 502A and the piston 514 to drive the piston through the supply of working oil, and a plate spring 515 provided between the multiple-disk clutch C4 and the piston 514 to push the piston toward the hydraulic servomechanism C-4. The limiting mechanism 510 acts to engage the multiple-disk clutch C4 to rotate the center differential case 504 and the planet carrier PC4 at the same speed. The transmission of motive power to the front wheel transmission mechanism 600 is performed through the case 611 of the front differential unit 610 connected to the sun gear Sg4. The transmission of motive power to the rear wheel driving mechanism 700 is performed through the planet carrier shaft 521 of the planet carrier PC4.

The front wheel transmission mechanism 600 includes the front differential unit 610 composed of a front differential unit case 611, in which a left-hand case 613 and a right-hand case 612 provided integrally with the sun gear Sg4 of the fourth planet gear unit U4 of the center differential unit 500 are clamped on each other by bolts, a differential pinion shaft 614 supported by the front differential unit case 611, a differential pinion 615 rotatably supported by the differential pinion shaft 614, a differential right-side gear 616 engaged at the right with the differential pinion 615, and a differential left-side gear 617 engaged at the left with the differential pinion 615. A right front wheel driving shaft 601, which drives a right front wheel, is spline-fitted with the inner portion of the differential right-side gear 616. A left front wheel driving shaft 602, which is a second output shaft to drive a left front wheel, is spline-fitted with the inner portion of the differential left-side gear 617. The right-hand end of the right front wheel driving shaft 601 is rotatably supported by a ball bearing 603 on the large gear case 170 and is furnished with an oil seal 604 so that oil in the transmission case 110 is prevented from flowing out. An oil seal 605 is provided between the outside surface of the left front wheel driving shaft 602 and the inside surface of the transmission unit case 130 so that the oil in the transmission case 110 is prevented from flowing out.

The rear wheel driving mechanism 700 includes a large gear shaft 705, forming a connecting member, spline-fitted with the inside of the right-hand end portion of a planet carrier shaft 521, the large gear 711 which is the intersecting gear or skew gear 710 which is spline-coupled to the outside of the halfway portion of the large gear shaft 705 and has a large intermeshing ratio and a low intermeshing noise, and the small gear 712 which is a hypoid gear 710 engaged with the large gear 711 and furnished with a rear wheel driving shaft 706 which is a third output shaft, on the outside surface of the rear end portion of which a sleeve yoke 706A is fitted. Motive power transmitted to the large gear 711 is transmitted to the rear wheels through the sleeve yoke 706A. A large gear shaft 705 is rotatably supported, and is fitted at the left-hand portion with a conical bearing 701 and a double-lip oil seal 702 and at the right-hand portion with a conical bearing 703 and a double-lip oil seal 704, in a large gear case 170. The rear wheel driving shaft 706 is rotatably supported by conical bearings 707 and 708 in a small gear case 180. An oil seal 709 is provided on the outside surface of the sleeve yoke 706A at the rear end of the shaft 706 so that oil in the small gear case 180 is prevented from flowing out. The space 720 defined by the oil seals 702 and 704, the large gear case 170 and the large gear shaft 705, and the internal space 730 of the small gear case 180 are disconnected from the internal space of the transmission case 110 by the oil seals 702, 704 and 709 so that the oil in the spaces 720 and 730 may be separated from that in the latter. As a result, hypoid gear lubrication oil can be used only in the spaces 720 and 730.

The engagement and disengagement of the clutch C4 are performed by the optional changeover operation of operating person or by the action of electronic controller (not shown in the drawings) depends on the running condition of the vehicle.

Figure 3:
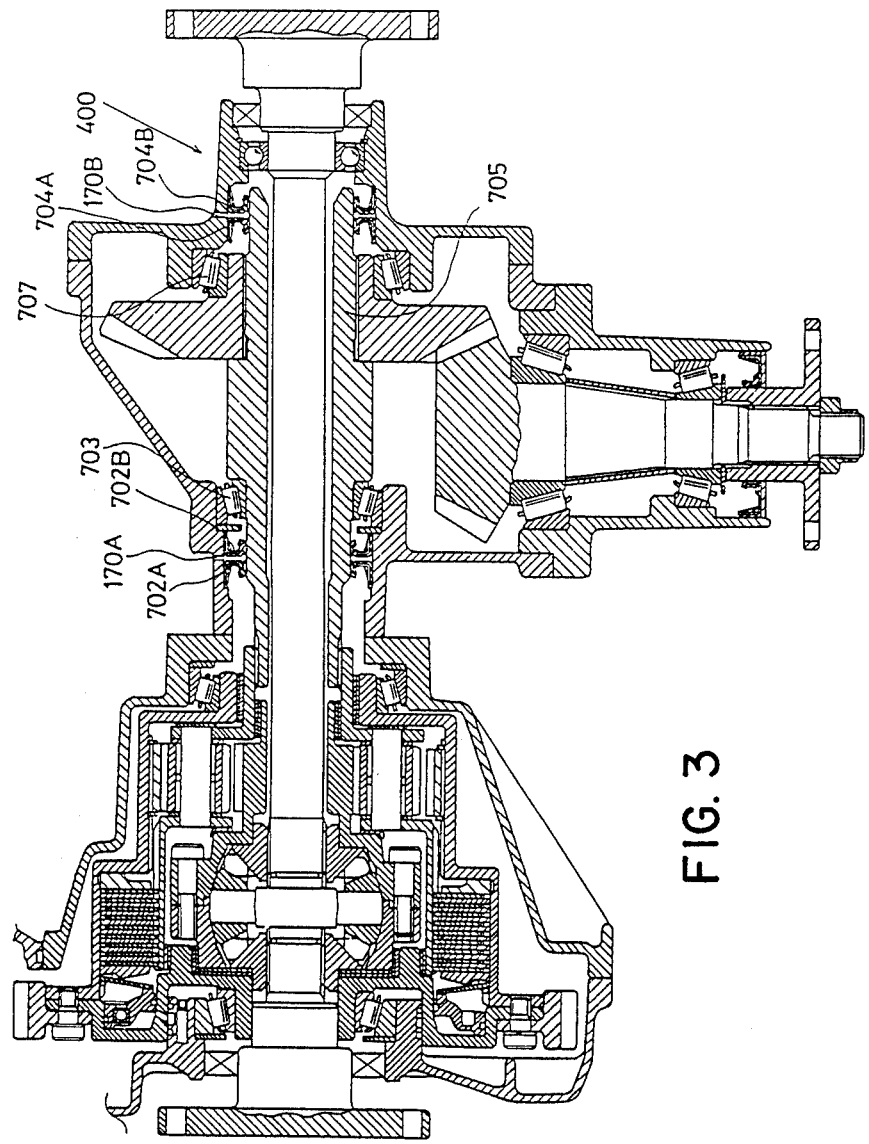

FIG. 3 shows another embodiment of the present invention. The large gear case 170 of a transfer 400, which houses a large gear 711, is provided with air passage holes 170A and 170B, which are located at oil seals near conical bearings 703 and 707 and through which the interior and exterior of a transmission case 110 communicates with each other. The single-lip oil seals 702A, 702B, 704A and 704B are provided between the large gear case 170 and a large gear shaft 705 and located at both the sides of the inner ports of the air passage holes 170A and 170B, so that oil is prevented from flowing out through the air passage holes 170A and 170B, and the oil-sealing property is improved.

In each of the above embodiments, the present invention is applied to a multi-speed transmission including a transmission unit made of planet gear units. However, the present invention may be applied to a multi-speed transmission including plural spur gear trains, a continuously variable transmission including a V-belt, or the like.

What is claimed is:

1. A four wheel drive automatic transmission, comprising:
    a speed changing transmission unit;
    a front wheel transmission mechanism driven by the transmission unit and having a large driving gear and bearings for the large driving gear;
    a center differential unit having an input member driven by the large driving gear and two output members for driving front wheels and for driving rear wheels, respectively;
    a transfer having a case and a rear wheel driving mechanism, the rear wheel driving mechanism including a driving gear member with a first hypoid gear disposed coaxially with the output member for rear wheel driving, a connecting member between the output member for rear wheel driving and the driving gear member, a transfer output gear member with a second hypoid gear drivable by the first hypoid gear of the driving gear member and bearings disposed on the connecting member and the case; and,
    an oil separating structure defining separately lubricatable cavities within the case for housing the rear wheel driving mechanism and the center differential unit respectively, the structure comprising a seal member disposed near each of the bearings, between the connecting member and the case, at opposite ends of the rear wheel driving mechanism, the seal members being positioned to locate the bearings in the cavity housing the rear wheel driving mechanism whereby the rear wheel driving mechanism can be filled with a lubricant different from that used for lubricating the center differential unit, without risk of the different lubricants mixing.

2. The automatic transmission of claim 1, wherein the transfer output gear member rotates about an axis disposed substantially perpendicularly to the coaxes of the output member for rear wheel driving and the driving gear member.

3. The automatic transmission of claim 1, wherein the connecting member is cylindrical and mounted for rotation over the output member for front wheel driving and the driving gear member is disposed over and fixed to the connecting member, the lubricant for the transmission unit, the front wheel driving mechanism and the center differential unit circulating between the output member for front wheel driving and the cylindrical connecting member, whereby one of the cavities surrounds a portion of the other cavity.

4. The automatic transmission of claim 1, wherein the cavity for the rear wheel driving mechanism surrounds the other cavity.

5. The automatic transmission of claim 4, wherein the connecting member is cylindrical and defines an annular wall separating the cavities between the seal members.

* * * * *